United States Patent [19]

Newell et al.

[11] Patent Number: 5,077,462

[45] Date of Patent: Dec. 31, 1991

[54] VENDING APPARATUS INCORPORATING AN IMPROVED CLOSED LOOP POSITIONING SYSTEM

[76] Inventors: William C. Newell, 750 S. Pleasant View, Post Falls, Id. 83854; Jesse A. Ojala, 1423 Randle, Coeur d'Alene, Id. 83814

[21] Appl. No.: 543,266

[22] Filed: Jun. 25, 1990

[51] Int. Cl.⁵ .............................................. G06K 5/00
[52] U.S. Cl. .................................... 235/381; 235/375; 235/383; 235/385; 364/479
[58] Field of Search ............... 235/375, 383, 385, 381; 364/479

[56] References Cited

U.S. PATENT DOCUMENTS

| | | | |
|---|---|---|---|
| 4,519,522 | 5/1985 | McElwer | 364/479 |
| 4,814,592 | 3/1989 | Bradt et al. | 235/381 |
| 4,839,505 | 6/1989 | Bradt et al. | 235/381 |

*Primary Examiner*—Harold Pitts
*Attorney, Agent, or Firm*—Graybeal Jackson Richardson & Haley

[57] ABSTRACT

This invention relates to the field of vending machines and more specifically to an improved method and means for detecting and correcting positioning errors in a vending machine. A carousel type dispensing apparatus is incorporated.

4 Claims, 9 Drawing Sheets

| RING 1 (INNER RING) | | | RING 2 (MIDDLE RING) | | | | | | RING 3 (OUTER RING) | | | | | |
|---|---|---|---|---|---|---|---|---|---|---|---|---|---|---|
| TITLE | PHYSICAL BIN | BAR CODE NUMBER | TITLE | PHYSICAL BIN | BAR CODE NUMBER | TITLE | PHYSICAL BIN | BAR CODE NUMBER | TITLE | PHYSICAL BIN | BAR CODE NUMBER | TITLE | PHYSICAL BIN | BAR CODE NUMBER |
| AA | 1 | 01 | BA | 21 | 01 | CA | 41 | 41 | DA | 61 | 01 | EA | 81 | 28 | FA | 101 | 54 |
| AB | 2 | 05 | BB | 22 | 03 | CB | 42 | 43 | DB | 62 | 02 | EB | 82 | 29 | FB | 102 | 56 |
| AC | 3 | 09 | BC | 23 | 05 | CC | 43 | 45 | DC | 63 | 04 | EC | 83 | 30 | FC | 103 | 57 |
| AD | 4 | 13 | BD | 24 | 07 | CD | 44 | 47 | DD | 64 | 05 | ED | 84 | 32 | FD | 104 | 58 |
| AE | 5 | 17 | BE | 25 | 09 | CE | 45 | 49 | DE | 65 | 06 | EE | 85 | 33 | FE | 105 | 60 |
| AF | 6 | 21 | BF | 26 | 11 | CF | 46 | 51 | DF | 66 | 08 | EF | 86 | 34 | FF | 106 | 61 |
| AG | 7 | 25 | BG | 27 | 13 | CG | 47 | 53 | DG | 67 | 09 | EG | 87 | 36 | FG | 107 | 62 |
| AH | 8 | 29 | BH | 28 | 15 | CH | 48 | 55 | DH | 68 | 10 | EH | 88 | 37 | FH | 108 | 64 |
| AI | 9 | 33 | BI | 29 | 17 | CI | 49 | 57 | DI | 69 | 12 | EI | 89 | 38 | FI | 109 | 65 |
| AJ | 10 | 37 | BJ | 30 | 19 | CJ | 50 | 59 | DJ | 70 | 13 | EJ | 90 | 40 | FJ | 110 | 66 |
| AK | 11 | 41 | BK | 31 | 21 | CK | 51 | 61 | DK | 71 | 14 | EK | 91 | 41 | FK | 111 | 68 |
| AL | 12 | 45 | BL | 32 | 23 | CL | 52 | 63 | DL | 72 | 16 | EL | 92 | 42 | FL | 112 | 69 |
| AM | 13 | 49 | BM | 33 | 25 | CM | 53 | 65 | DM | 73 | 17 | EM | 93 | 44 | FM | 113 | 70 |
| AN | 14 | 53 | BN | 34 | 27 | CN | 54 | 67 | DN | 74 | 18 | EN | 94 | 45 | FN | 114 | 72 |
| AO | 15 | 57 | BO | 35 | 29 | CO | 55 | 69 | DO | 75 | 20 | EO | 95 | 46 | FO | 115 | 73 |
| AP | 16 | 61 | BP | 36 | 31 | CP | 56 | 71 | DP | 76 | 21 | EP | 96 | 48 | FP | 116 | 74 |
| AQ | 17 | 65 | BQ | 37 | 33 | CQ | 57 | 73 | DQ | 77 | 22 | EQ | 97 | 49 | FQ | 117 | 76 |
| AR | 18 | 69 | BR | 38 | 35 | CR | 58 | 75 | DR | 78 | 24 | ER | 98 | 50 | FR | 118 | 77 |
| AS | 19 | 73 | BS | 39 | 37 | CS | 59 | 77 | DS | 79 | 25 | ES | 99 | 52 | FS | 119 | 78 |
| AT | 20 | 77 | BT | 40 | 39 | CT | 60 | 79 | DT | 80 | 26 | ST | 100 | 53 | FT | 120 | 80 |

VENDING APPARATUS INCORPORATING AN IMPROVED CLOSED LOOP POSITIONING SYSTEM

BACKGROUND OF THE INVENTION

Various types of vending machines have been developed for dispensing a variety of articles such as books, cassettes, and food items, etc. One type of vending machine incorporates a carousel for storing and dispensing articles wherein articles are stored in bins arranged concentrically within the carousel. Typically, a positioning system is used to rotate the carousel to predetermined positions wherein an article may be retrieved through an opening in the face of the vending machine. Prior carousel type vending machines employ stepper motors and controllers which rely on encoders for determining the relative position of the carousel. While these systems are effective, they are also quite expensive.

One example of a carousel type vending machine is disclosed in U.S. Pat. No. 4,519,522. In this system the rotation of the carousel is achieved with a stepper motor and a shaft encoder wherein a complicated controller is required to advance or retard the carousel to the desired position. In U.S. Pat. No. 4,563,120, a non-carousel type of dispensing machine is disclosed wherein a grid of bins are arranged in a planar array. A carriage is moved to access articles within individual bins wherein the carriage position is also controlled by a stepper motor.

In each of the above systems, the cost and complexity of each of the respective systems is increased dramatically by the need for a stepper motor.

SUMMARY OF THE INVENTION

Accordingly, it is an object of the present invention to provide an accurate and inexpensive positioning system.

It is yet another object of the present invention to provide a positioning system which can be implemented with a conventional D.C. motor.

It is another object of the present invention to provide a system for automatically detecting potential machine malfunctions prior to catastrophic system failure.

In summary, the present invention contemplates a closed loop positioning system which includes a carousel rotatably disposed on a support shaft wherein the carousel includes a plurality of apertures disposed along the perimeter thereof. A conventional D.C. motor coupled to the carousel is used for controlling the rotational position of the carousel. A bar code ring disposed coaxially with the perimeter of the carousel codes the absolute position of the carousel. A sensor detects whenever the apertures of the carousel are aligned with the sensor means. A bar code scanner reads the values of the bar codes and a controller coupled to the sensor, the scanner and the motor, advances or retards the rotational position of the carousel a predetermined amount based on the output of the controller and verifies the predetermined amount of movement based on the output of the bar code scanner.

DETAILED DESCRIPTION OF THE INVENTION

Figure 1:
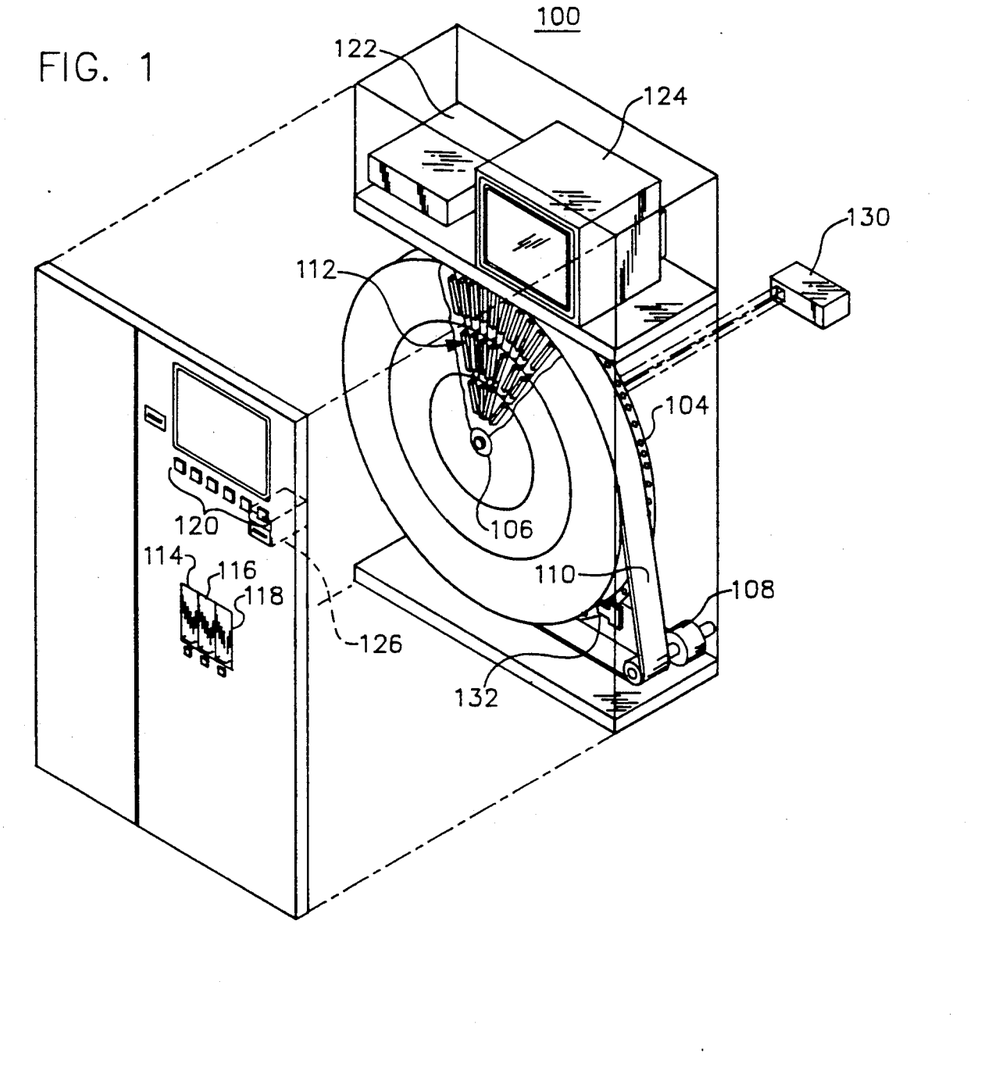
FIG. 1 is a drawing depicting a carousel type dispensing machine adapted for use with the closed loop positioning system of the present invention.

The present invention comprises a positioning system which is particularly adapted for use with a vending machine of the type shown in FIG. 1. The vending machine 100, incorporates a carousel 104 which is rotatably supported on spindle 106 wherein the carousel 104 is coupled to a conventional D.C. motor 108 with belt 110. The belt 110 may be constructed of any of a number of materials and preferably comprises a conventional v-belt. The angular position of carousel 104 is adjusted by selectively activating the D.C. motor 108 wherein the direction of travel of carousel 104 is controlled by the polarity of the voltage across D.C. motor 108.

The carousel 104 may preferably be configured with a plurality of bins arranged in a plurality of concentric rings wherein the bins 112 are adapted for storing articles to be dispensed such as video tapes. The bins 112 are aligned with doors 114–118 such that individual bins are aligned with doors 114–118 when the carousel 104 is in a predetermined position so articles may be stored in or removed from the bins 112 through doors 114–118. As in prior vending machines, articles may be selected with exemplary controls 120 which are coupled to a control system 122. The dispensing machine 100 may also include a video display 124 for displaying system status information and a magnetic card reader 126 for receiving customer account information.

As will be discussed in more detail below, the improved positioning system of the present invention incorporates a bar code scanner 130 and an aperture sensor 132 for detecting the position of carousel 104.

Figure 2A:
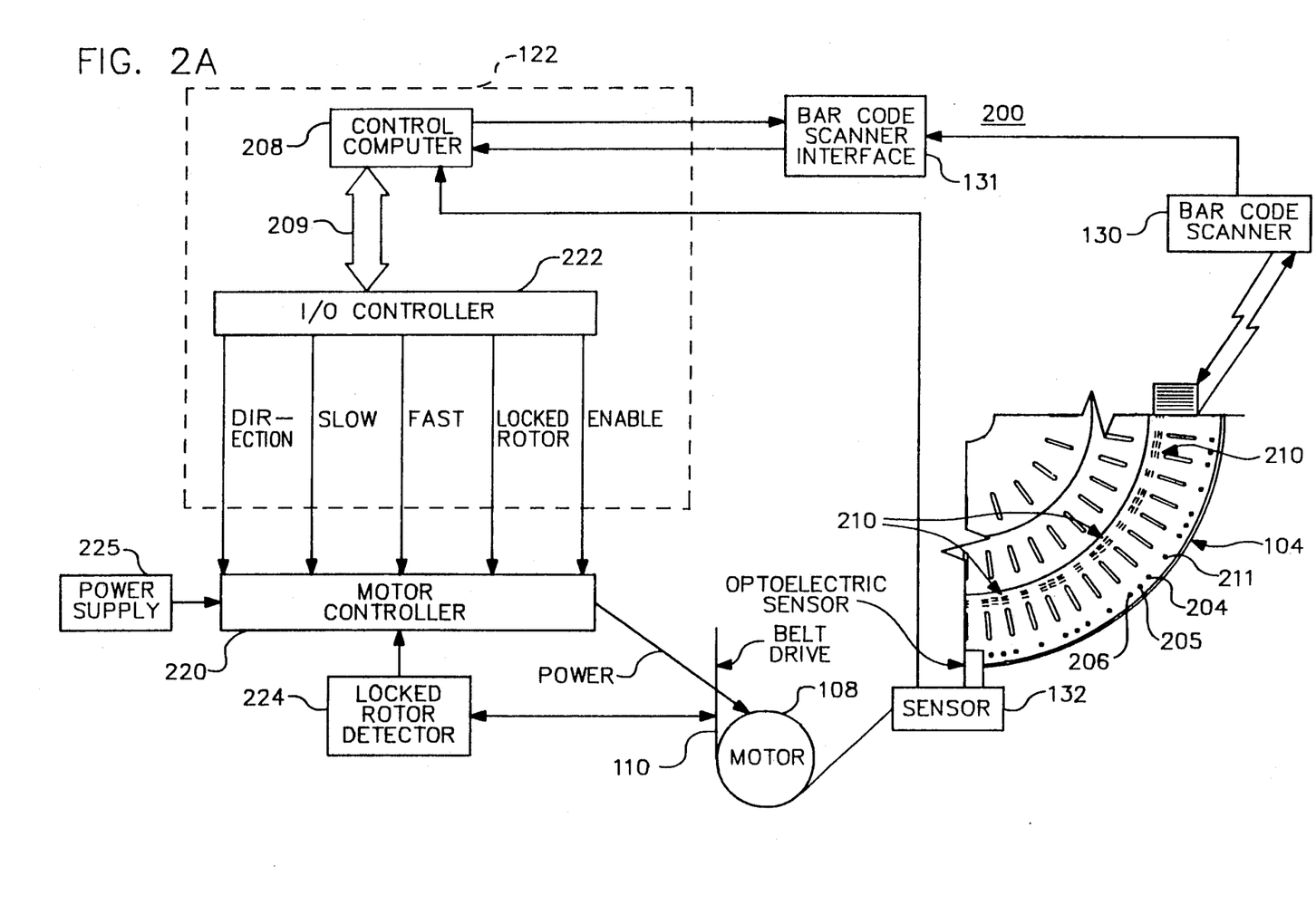
FIG. 2A is a block diagram of the circuitry used to implement the closed loop positioning system of the present invention.
Figure 2B:
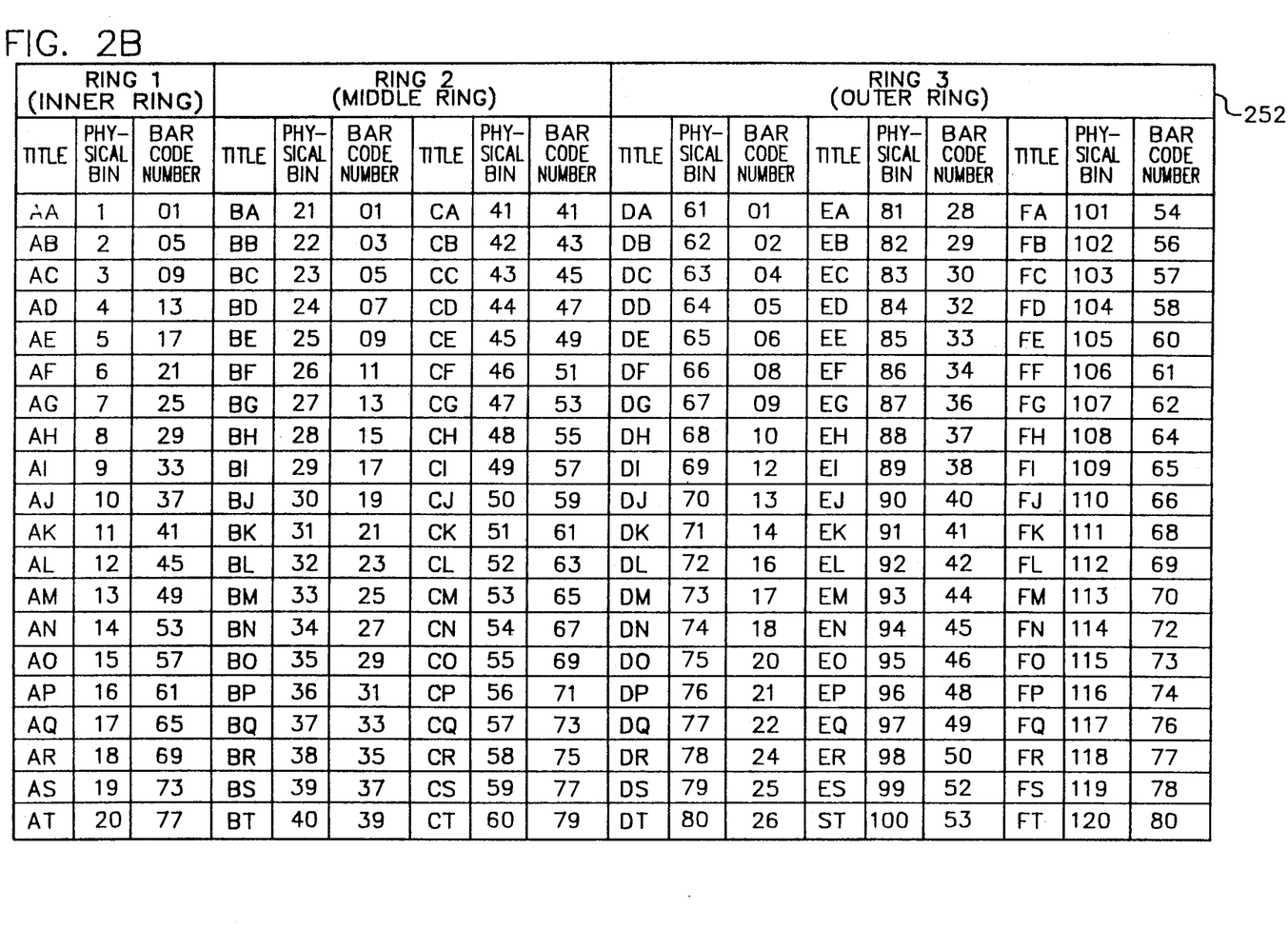
FIG. 2B is a diagram of a look-up table used to identify the location of articles in the positioning system of the present invention.

Referring now to FIGS. 2A and 2B, the positioning system 200 includes carousel 104 having a plurality of apertures (e.g. apertures 211, 204–206) disposed about the perimeter of the carousel 104, and a carousel position bar code ring 210 disposed coaxially with respect to the plurality of apertures wherein each aperture is aligned with a particular bar code area. The bar codes of the bar code ring 210 as well as the apertures 211, 204–206 are disposed in a pattern of three bar code areas/apertures, separated by a space, followed by three bar code areas/apertures, etc. This arrangement is useful to encode the position of three offset concentric bin rings within carousel 104.

The system 200 includes sensor 132 which detects when the sensor 132 is aligned with an aperture. The bar code scanner 130 reads the bar code currently aligned with the bar code scanner 130. A control computer 208 receives inputs from the sensor board 132 as well as the bar code scanner interface 131. The bar code scanner interface 131 receives inputs from the bar code scanner 130 and converts the TTL output signal of scanner 130 to an ASCII signal processed by control computer 208. A bar code scanner and bar code interface suitable for use with the present invention is the MS-500 scan head and the MS-2000 decoder available from Microscan Systems, Inc., 939 Industry Drive, Tukwila, Wash. 98188. The position of carousel 104 is controlled by motor 108 which is coupled to carousel 104 via belt 110. The belt 110 is preferably of the well-known v-belt type.

The motor 108 is responsive to signals developed by D.C. motor controller 220 which is in turn controlled by control computer 208 through I/O controller 222. I/O controller 222 is a conventional computer interface device which communicates with control computer 208 through data bus 209. An I/O controller 222 suitable for use with the present invention is available from Metrabyte, 440 Myles Standish Blvd., Taunton, Mass. 02780. The I/O controller 222 receives commands from control computer 208 and in response thereto generates a plurality of motor control signals. Specifically, motor controller 220 generates a positive or negative D.C. voltage for actuating D.C. motor 108 as well as generating various status signals regarding the state of the system. Specifically, the motor controller 220 receives as inputs an enable signal, a direction control signal, and a signal for effecting fast and slow operating modes. In addition, motor controller 220 outputs a signal which indicates whether the motor rotor is locked. A conventional power supply 225 provides power to the system 200.

Figure 7:
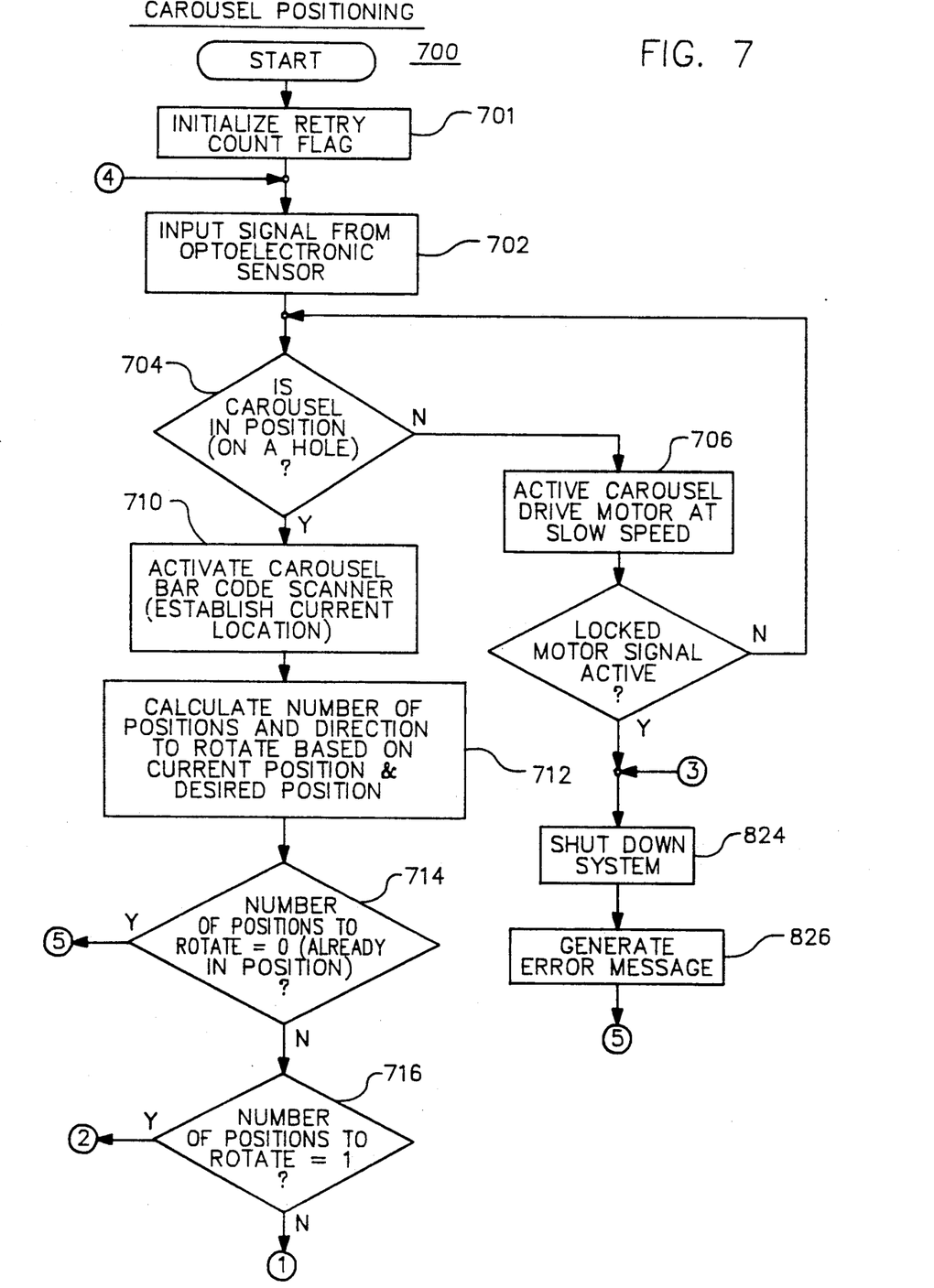
FIG. 7 is a flow diagram of describing the operation of the controller of FIG. 4.

The detailed operation of the system 200 is described in more detail in conjunction with FIG. 7. Briefly, the initial carousel position is determined by aligning the sensor 132 with an aperture and by reading the bar code in code ring 210 corresponding with that position. In use, a user signals control computer 208 to move the carousel 104 to a predetermined position as is discussed in more detail below. Each valid position of carousel 104 is indicated by the carousel code ring 210. The control computer 208 then calculates the number of apertures between the current position and a desired position based on data stored in a look-up table of the type shown in FIG. 2B. Table 252 is created as inventory is loaded into carousel 104. As each item is loaded in the carousel 104, the bar code corresponding to its position is recorded in the look-up table 252. Table 252 may be utilized as follows. It is determined where the carousel is presently located by reading the bar code at the current carousel position (e.g., bar code positions 1-80). If an article in bin 60 is desired and the carousel 104 is currently at position 01, it can be determined that the carousel 104 must be rotated (in reverse) by 2 apertures. Similarly, if an article in bin 60 is desired and the carousel 104 is currently in position 59, it can be determined that the carousel 104 must be rotated (in forward) by 20 apertures.

Once the desired movement is determined, the motor 108 is then activated at fast speed until the desired position is within one aperture, at which time the motor 108 is switched to a slow speed to attain the final position. After movement of carousel 104 is terminated, the control computer 208 instructs the bar code scanner 130 to read the bar code currently aligned with the scanner to verify that the correct position was attained. If the correct position was not attained, the control computer 208 records the positioning error (for use as a diagnostic) and the positioning sequence is repeated. Whenever the carousel 104 is in motion, the control computer 208 continuously monitors for a locked rotor condition through locked rotor detector 224.

Figure 3:
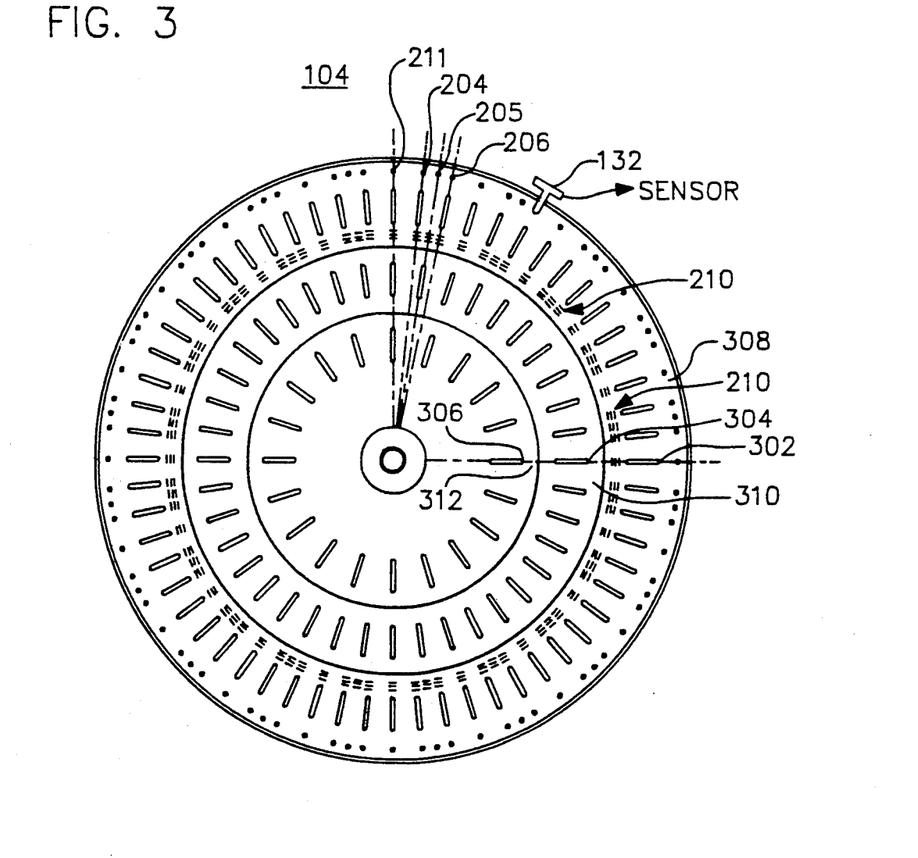
FIG. 3 is a rear window diagram of the carousel of the vending machine of FIG. 1.

Referring now to FIG. 3, the rear face of carousel 104 is shown. In the preferred practice of the present invention, in the rear face of carousel 104, relatively large apertures (e.g. apertures 302, 304, 306) are disposed in a position coinciding with the position of each of the respective bins 112 of carousel 104 so that the contents of each of the respective bins are visible through an aperture. As noted above, the respective bins are arranged in a plurality of concentric rings 308-312 with compartments within each ring being spaced equidistant from each other. In the embodiment shown in FIG. 3, ring 308 contains 60 compartments, ring 310 contains 40 compartments, and ring 312 contains 20 compartments. In this arrangement, four apertures are required to locate the radial center axis of bins within each concentric ring 308-312 as shown by exemplary apertures 211, 204-206. The pattern formed by apertures 211, 204-206 is repeated around the circumference of carousel 104 to encode the rotational position of each compartment in carousel 104.

Figure 4:
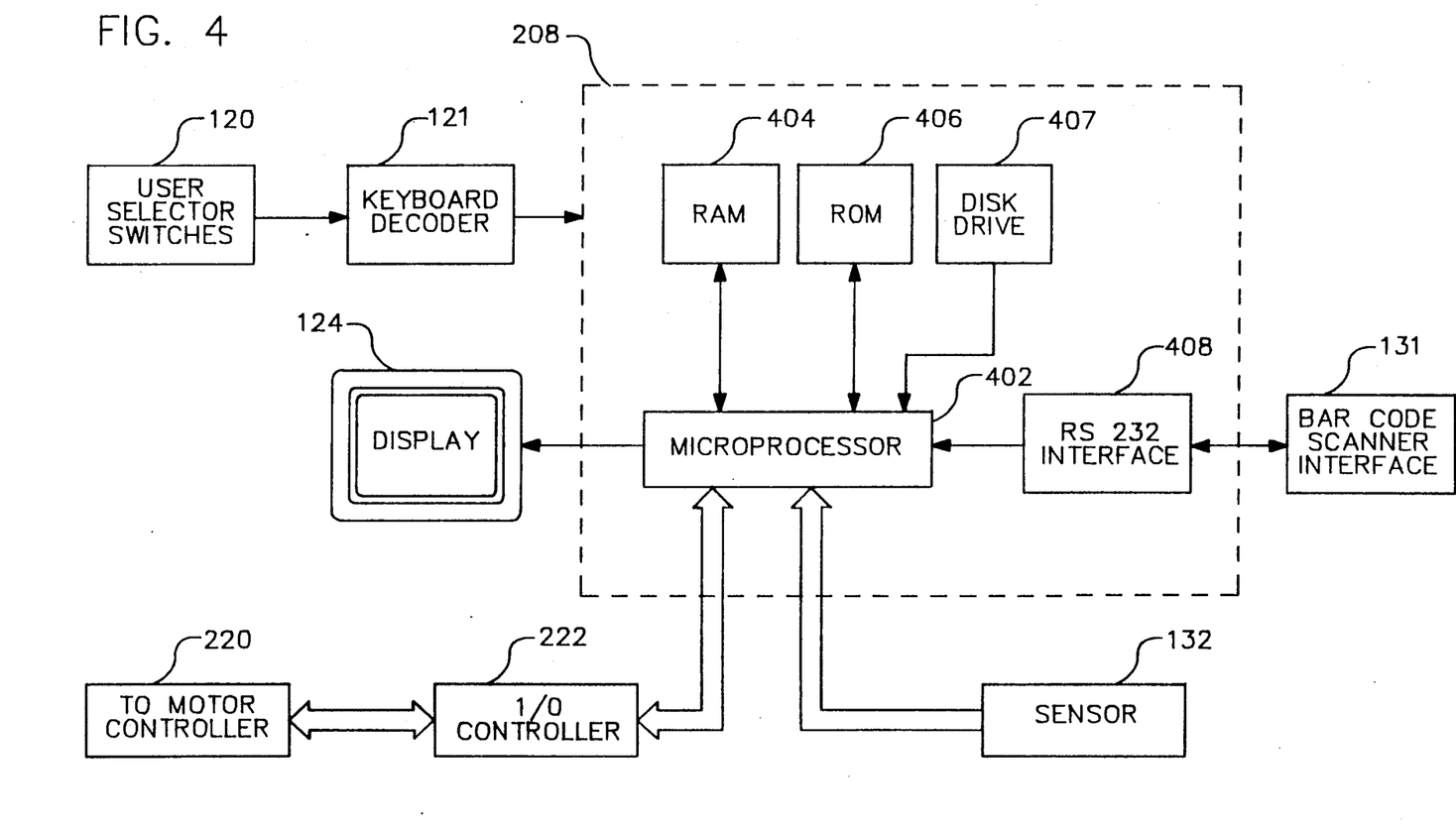
FIG. 4 is a block diagram of the computer controller used to control the closed loop positioning system of the present invention.

Referring now to FIG. 4, the computer controller 208 comprises a conventional microprocessor 402, a RAM 404, a ROM 406, disk drive 407, and an RS-232 interface 408 coupled in the same configuration as a general purpose microcomputer. The operation of microprocessor 402 is described in more detail in conjunction with the flow diagrams below. Computer controller 208 communicates control signals to and from motor controller 220 through I/O controller 222; receives input signals from sensor 132; communicates control and data signals from bar code scanner interface 131 through RS-232 interface 408; receives user input from user selector switches 120 through keyboard decoder 121; and outputs status information to display 124.

Figure 5:
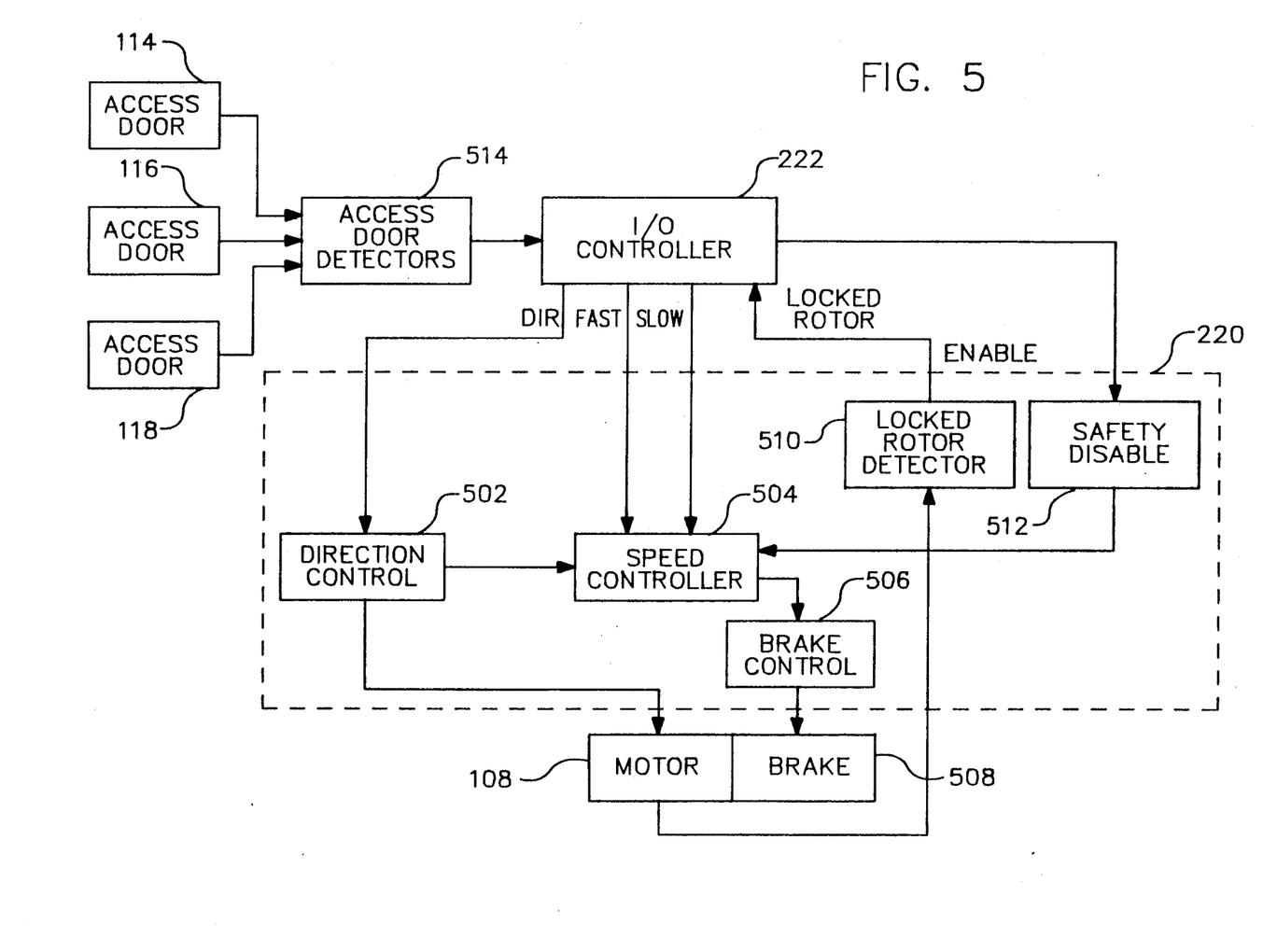
FIG. 5 is a block diagram of the motor controller of FIG. 2A.

Referring now to FIG. 5, the motor controller 220 comprises a number of conventional circuits which may be implemented in a number of ways. The direction controller 502 is responsive to the direction control signal generated by I/O controller 222 and it controls the polarity of the voltage across motor 108. The speed controller 504 may be constructed of conventional circuitry which is responsive to the fast and slow control signals generated by I/O controller 222 and it generates a variable D.C. voltage which is based on the currently selected mode of operation. In the preferred practice of the present invention, speed controller 504 generates 90 volts in the fast mode, 60 volts in the slow mode, and 0 volts if neither mode is selected, although the actual voltages may vary depending on the specific D.C. motor used with the system. A brake control 506 is coupled between speed controller 504 and brake 508 to effect a braking signal whenever a fast or slow motor control signal is absent. Brake 508 is responsive to the braking signal and it comprises a well known device which clamps the rotor of motor 108 whenever the braking signal is actuated. A current monitor 510, coupled between motor 108 and I/O controller 222, monitors the amount of current consumed by motor 108 to detect a locked rotor condition (which is indicated by an excessive amount of current consumed by motor 108). If such a condition is detected, the motor 108 is disabled by safety disable 512. Similarly, access door detectors 514, coupled to access doors 114-118, detect when an access door is open. When such a condition is detected, the safety disable circuit 512 disables motor 108.

Figure 6:
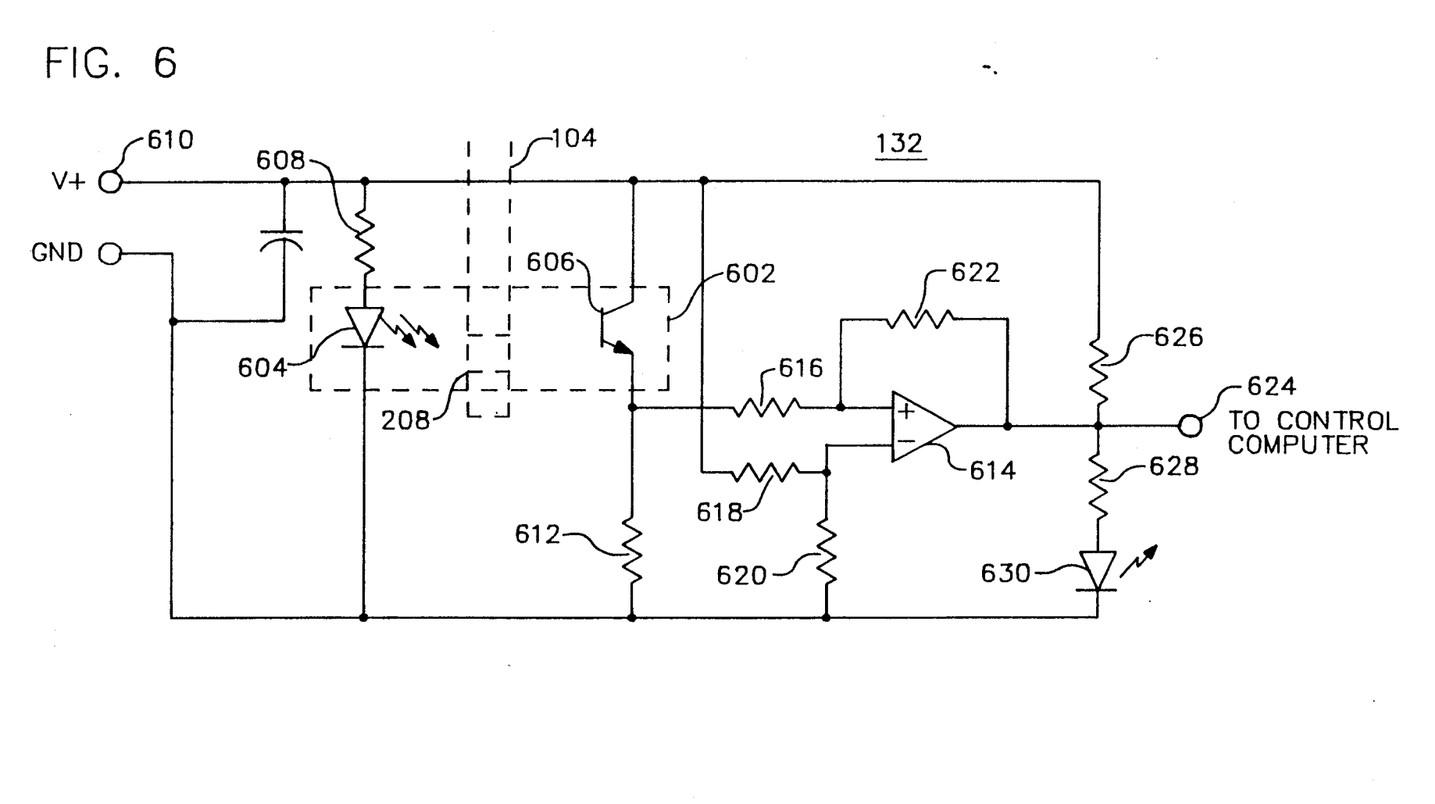
FIG. 6 is a schematic diagram of the sensor board of FIG. 2A.

Referring now to FIG. 6, the sensor 132 comprises an emitter/detector 602 comprising laser diode 604 and detector 606. Resistor 608, coupled between laser diode 604 and a V+ power supply input 610, provides power to laser diode 604. Laser diode 604 and detector 606 are disposed on either side of carousel 104 aligned with the respective apertures disposed about the circumference of carousel 104 so that the light generated by laser diode 604 travels through the apertures (e.g. aperture 206) to activate detector 606. When detector 606 is activated, current flows from the V+ power supply terminal 610 into resistor 612 thus generating a positive voltage across resistor 612 which is coupled through resistor 616 to the noninverting input of buffer amplifier 614. A reference voltage for buffer amplifier 614 is provided by voltage divider formed by resistors 618 and 620. The gain of buffer amplifier 614 is controlled by resistor 622. The output of buffer amplifier 614 is coupled to control computer 208 through output terminal 624. Pull-up resistor 626 is disposed between output terminal 624 and V+ input terminal 610. Resistor 628 and LED 630 provide an indicator light for aperture detection.

Figure 8:
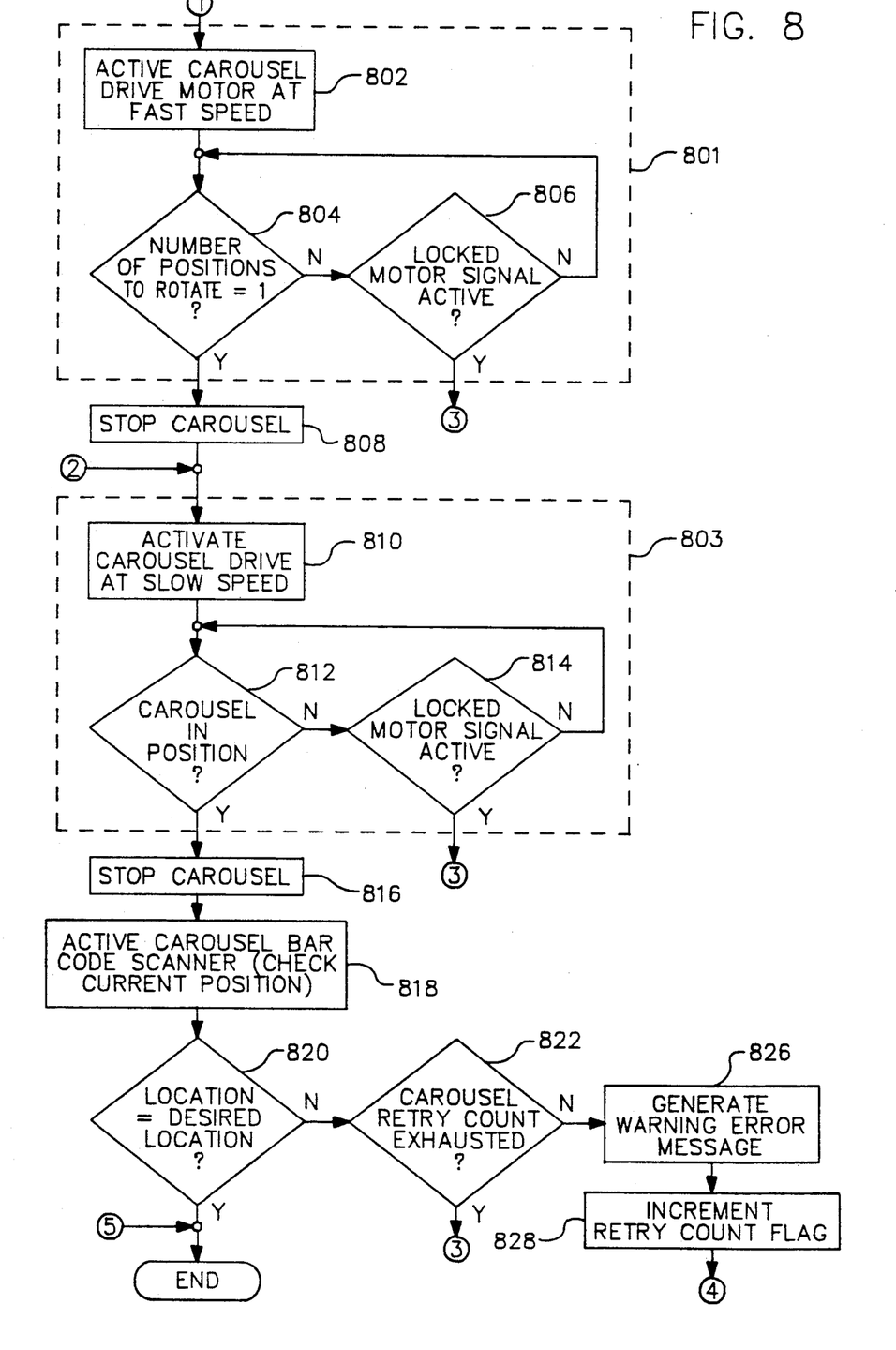
FIG. 8 is a continuation of the flow diagram of FIG. 7.

Referring now to FIGS. 7-8, the detailed operation of the control computer 208 is shown. When the carousel positioning routine is invoked, item 701 initializes a recount counter. Item 702 and decision 704 then read the output of sensor 132 to determine whether the carousel 104 is in a valid position. A valid position is defined as a position wherein the sensor 132 is aligned with an aperture (e.g., apertures 211, 204-206). If the carousel 104 is not in a valid position, item 706 activates the carousel drive motor 108 in the slow speed. While the carousel 104 is moving, decision 708 monitors the rotor locked signal to ensure the motor is not locked. Assuming the drive motor 108 is not locked, control passes to decision 704 until the carousel position is initialized. Once the carousel position is initialized, item 710 activates the bar code scanner 130 to read the current position of the carousel 104. Item 712 then calculates the number of positions and direction to rotate the carousel 104 based on the current and the desired position.

As noted above, the present invention contemplates the use of a carousel having compartments for storing and dispensing articles. The compartments are arranged in offset concentric rings wherein the outer ring has 60 compartments, the middle ring has 40 compartments and the inner ring has 20 compartments. In the preferred practice of the present invention, 80 apertures are used to encode the position of all 120 compartments. As mentioned above, a mapping table 252 is used to map the 80 aperture positions to physical compartments. This mapping table 252 is used by item 712 when calculating the number of positions in which to rotate the carousel 104 to a desired position. In other words, each compartment in any of the three rings may be used to store a unique article. Each compartment may be identified by a unique bar code, and by its ring number, e.g., ring 308, 310, 312. The mapping table 252 is used to correlate the location of each unique compartment with its corresponding bar code/aperture as well as its ring number location.

Once a desired position for carousel 104 is calculated by looking up the desired position in the mapping table 252 and calculating an offset from the current carousel position, decision 714 determines whether the carousel is already in the desired position. If so, the routine returns. Otherwise, decision 716 determines whether the carousel is within one aperture of a desired position. If so, control passes to slow speed loop 803. If not, the system 200 enters fast speed loop 801, wherein item 802 starts moving the carousel 104 at fast speed while decision 806 monitors the motor 108 for a locked condition. Decision 804 determines whether the carousel 104 is within one aperture of the desired position. If so, item 808 stops the carousel 104 and item 810 activates the carousel 104 at slow speed. Decision 812 then monitors the carousel 104 to determine when it is in the position corresponding to the next aperture, while decision 814 monitors the motor 108 for a locked condition. If decision 708, 806, or 814 detect a locked rotor condition, control passes to item 824 which shuts down the system while item 826 generates an error message. The routine then returns.

Once the carousel 104 is in the calculated position, the carousel 104 stops in item 816, and item 818 activates the bar code scanner 130 to read the bar code of the current carousel position. Decision 820 then determines whether the current position is the same as the desired location. If not, control passes to decision 822 which determines if the retry count has reached a predetermined maximum value. If so, control passes to items 824 and 826 and the routine then returns. Otherwise, item 626 generates a warning message and item 628 increments the recount flag. Control then returns to item 702 to repeat the procedure until the correct position is found or until the recount is exhausted, indicating a system failure.

In summary, an improved positioning system for use with a vending machine has been described. Accordingly, other uses and modifications of the present invention will be apparent to persons of ordinary skill without departing from the spirit and scope of the present invention and all of such uses and modifications are intended to fall within the scope of the appended claims.

We claim:

1. An improved closed loop positioning system, comprising:
   a carousel rotatably disposed on a support shaft, said carousel having a plurality of apertures disposed about the perimeter of said carousel;
   a motor coupled to said carousel, for adjusting the rotational position of said carousel;
   a bar code ring disposed coaxially with the perimeter of said carousel, said bar code ring for coding the absolute position of said carousel;
   sensor means for detecting whenever said apertures of said carousel are aligned with said sensor means;
   a scanner for reading the values of the bar codes; and
   controller means coupled to said sensor means, said scanner and said motor, said controller for advancing or retarding the rotational position of said carousel a predetermined amount based on the output of said scanner means and verifying the predetermined amount of movement based on the output of said scanner means.

2. The apparatus of claim 1 wherein said controller means includes a microprocessor.

3. The apparatus of claim 1 wherein said sensor includes a laser diode and a solid state receiver.

4. The apparatus of claim 1 wherein said carousel includes a plurality of compartments for storing and dispensing articles.

* * * * *

UNITED STATES PATENT AND TRADEMARK OFFICE
CERTIFICATE OF CORRECTION

PATENT NO. : 5,077,462
DATED : December 31, 1991
INVENTOR(S) : Newell, Ojala

It is certified that error appears in the above—identified patent and that said Letters Patent is hereby corrected as shown below:

On the Title page, in the drawing, the arrow connecting the Motor Controller to the Locked Rotor Detector should be reversed so the head of the arrow is touching the box labeled Locked Rotor Detector. In the drawing, Sheet 2, FIG. 2A, the arrow connecting the Motor Controller to the Locked Rotor Detector should be reversed so the head of the arrow is touching the box labeled Locked Rotor Detector. In the drawing, Sheet 5, FIG. 4, the portion of the text in the box designated by reference numeral 222 reading "1/0" should read --I/O--. In the drawing, Sheet 7, FIG. 6, the reference numeral "208" should read --206--. In the drawing, Sheet 8, FIG. 7, the portion of the text in the box designated by reference numeral 706 reading "ACTIVE" should read --ACTIVATE--; the decision box below the box designated by reference numeral 706 should be designated by reference numeral --708--; the text in the decision box just referred to as reference numeral 708 reading "MOTOR" should read --ROTOR--. In the drawing, Sheet 9, FIG. 8, the text in the box designated by reference numeral 802 reading "ACTIVE" should read --ACTIVATE--; the text in the decision box designated by reference numeral 806 reading "MOTOR" should read --ROTOR--; the text box designated by reference numeral 818 reading "ACTIVE" should read --ACTIVATE--.

UNITED STATES PATENT AND TRADEMARK OFFICE
CERTIFICATE OF CORRECTION

PATENT NO. : 5,077,462
DATED : December 31, 1991
INVENTOR(S) : Newell, Ojala

It is certified that error appears in the above-indentified patent and that said Letters Patent is hereby corrected as shown below:

Column 4, line 14, "bins 112 of carousel" should read --bins 112.

Column 6, line 29, "626" should read --826--.

Column 6, line 30, "628" should read --828--.

Signed and Sealed this

Eighth Day of June, 1993

Attest:

MICHAEL K. KIRK

Attesting Officer

Acting Commissioner of Patents and Trademarks